US005767937A

United States Patent [19]
Sumiyoshi

[11] Patent Number: 5,767,937
[45] Date of Patent: Jun. 16, 1998

[54] LIQUID CRYSTAL DISPLAY APPARATUS WITH OPTICAL COMPENSATION PLATES

[75] Inventor: Ken Sumiyoshi, Tokyo, Japan

[73] Assignee: NEC Corporation, Tokyo, Japan

[21] Appl. No.: 673,268

[22] Filed: Jun. 28, 1996

[30] Foreign Application Priority Data

Jun. 29, 1995 [JP] Japan ................................ 7-184965

[51] Int. Cl.$^6$ ........................ G02F 1/1335; G02F 1/13
[52] U.S. Cl. ........................ 349/119; 349/117; 349/186
[58] Field of Search ........................ 349/119, 117, 349/186

[56] References Cited

U.S. PATENT DOCUMENTS

| | | | |
|---|---|---|---|
| 4,973,137 | 11/1990 | Kozaki | 349/119 |
| 5,032,008 | 7/1991 | Yamamoto et al. | 349/119 |
| 5,166,817 | 11/1992 | Ota et al. | 349/119 |

OTHER PUBLICATIONS

New Normally White Negative Birefringence Film Compensated Twisted Nematic LCDs with Largest Viewing Angle Performance; H.L. Ong pp. 247–250.

Primary Examiner—William L. Sikes
Assistant Examiner—Julie Ngo

[57] ABSTRACT

A first optical compensation plate consists of M (M being an integer equal to or greater than 2) optical compensation layers. A second optical compensation plate consists of N (N being an integer equal to or greater than 2) optical compensation layers. A liquid crystal display panel has (M+N) liquid crystal layers. The liquid crystal layers are made of materials having optically different polarities from those of the first and second optical compensation plates. Further, the direction of the optic axis of a j-th (j=1, 2, ..., M) optical compensation layer from a first surface of the first optical compensation plate is substantially parallel to the direction of the optic axis of an (M−j+1)-th liquid crystal layer from the first optical compensation plate of the liquid crystal display panel at the time of voltage application, and the direction of the optic axis of an i-th (i=1, 2, ..., N) optical compensation layer from a third surface of the second optical compensation plate is substantially parallel to the direction of the optic axis of an (M+N−i+1)-th liquid crystal layer from the first optical compensation plate of the liquid crystal display panel at the time of voltage application.

4 Claims, 8 Drawing Sheets

DRAWING DIRECTION

RUBBING DIRECTION

RUBBING DIRECTION

POLARIZATION STATE

FIG. 3A
FIG. 3B
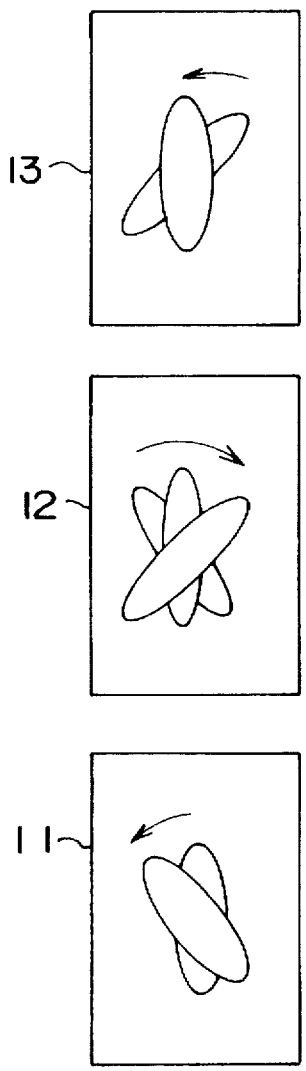
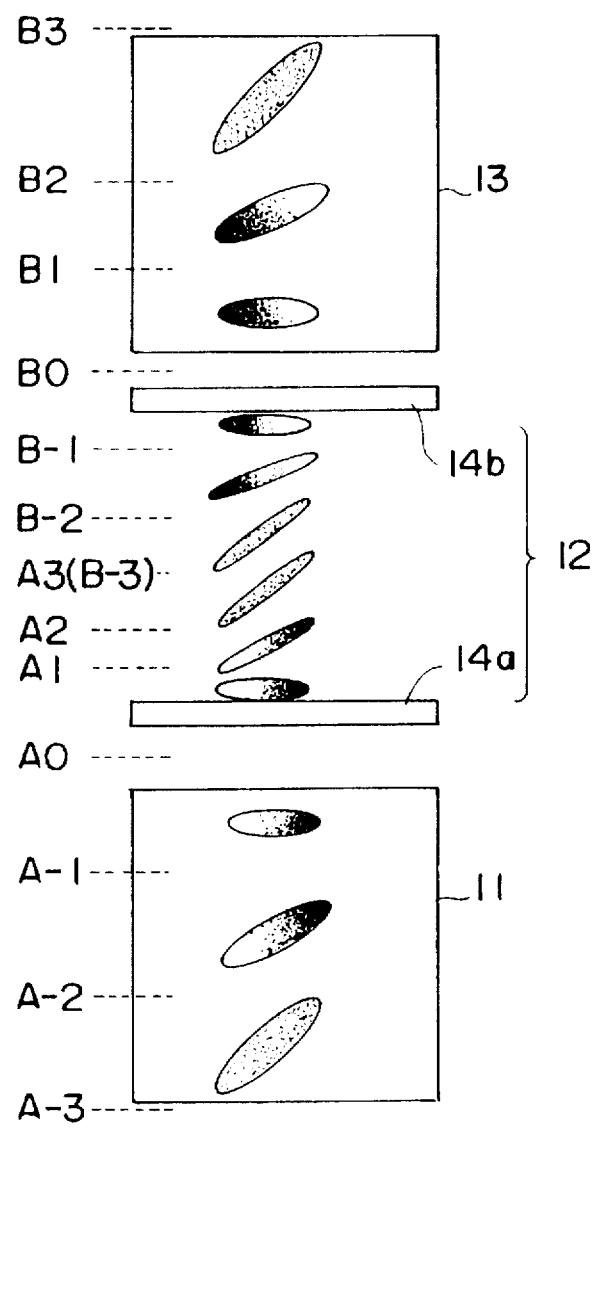
OPTIC AXIS

FIG. 5A
FIG. 5B
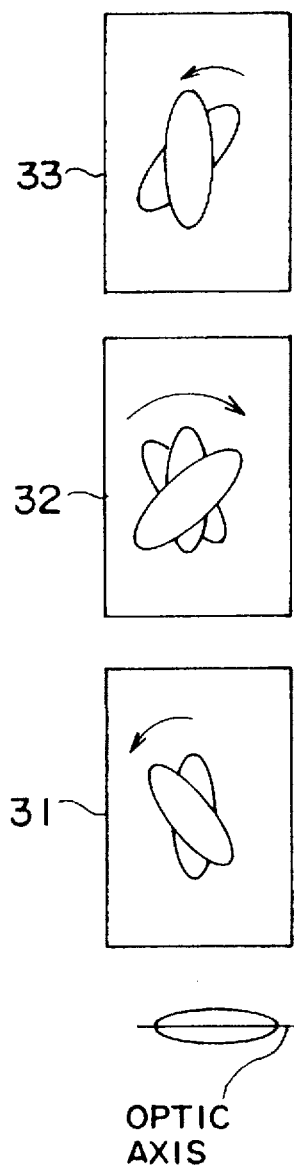
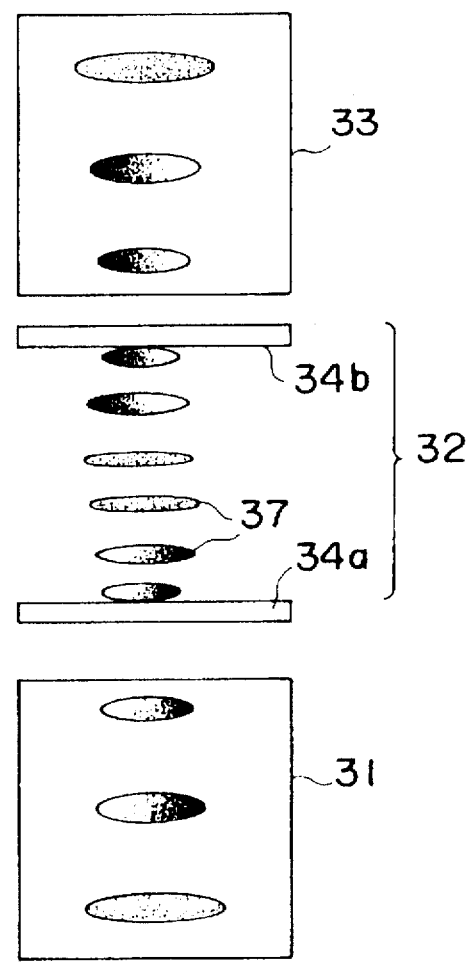
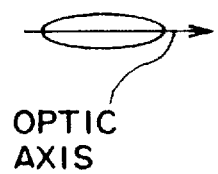
OPTIC AXIS 5,767,937

LIQUID CRYSTAL DISPLAY APPARATUS WITH OPTICAL COMPENSATION PLATES

BACKGROUND OF THE INVENTION

1. Field of the Invention

The present invention relates to a liquid crystal display apparatus to be used as a display in the fields of notebook type personal computers and vehicular devices or the like, and, more particularly, to a liquid crystal display apparatus with optical compensation plates to improve the visual sense dependency.

2. Description of the Related Art

Liquid crystal display (LCD) apparatuses are being put to practical use as displays with a low consumed current in the fields of notebook type personal computers and vehicular devices or the like. Various types of LCD devices are used in the LCD apparatuses. The highest attention has been given to a twisted nematic (TN) mode active matrix LCD apparatus which can easily provide gradation display, and the development of LCD devices is recently centered on this TN mode type.

The greatest shortcoming of the TN mode LCD panel is that when the position of observation comes off the front of the panel, the contrast ratio is greatly deteriorated. This relationship between the observation position and the contrast ratio is called the visual sense dependency and the shortcoming is caused as the obliquely incident light is changed in the LCD panel to a polarization state different from that of the perpendicular incident light.

As one solution to this drawback, there has been proposed an LCD apparatus which uses an optical compensation plate to improve the visual sense dependency, as disclosed in, for example, "New Normally White Negative Birefringence Film Compensated Twisted Nematic LCDs with Largest Viewing Angle Performance,"H. L. Ong, JAPAN DISPLAY '92, p. 247 (1992).

FIGS. 1A and 1B are exemplary diagrams showing the display section of a conventional LCD apparatus which uses an optical compensation plate. Light comes incident to an LCD panel 42 which is formed by sealing a liquid crystal between two glass substrates 43a and 43b.

While a voltage is applied to this normally white TN mode LCD panel 42, liquid crystal (LC) molecules 44 are aligned perpendicular to the substrates 43a and 43b. As shown in FIG. 1B, the conventional LCD apparatus approximately has an uniaxial type LC alignment structure in which with a voltage applied, the LC molecules 44 in the LCD panel 42 are aligned perpendicular to the substrates 43a and 43b. For example, the birefringence factor ($\Delta$n) of the LC molecules 44 has an optically positive polarity, so that a optical compensation plate 45 having an optically negative optic axis 46 is located on the side from which light goes out.

When light hits perpendicular to the LCD panel 42 in the thus constituted LCD apparatus, the light passes through the LCD panel 42 without changing the polarization state, and does not change the polarization state even when passing the optical compensation plate 45. Therefore, black is displayed when a voltage is applied to the LCD apparatus which the LCD panel 42 and the optical compensation plate 45 arranged between two polarization plates (not shown) whose polarization axes are perpendicular to each other.

When light is obliquely incident to the LCD panel 42, the light obliquely crosses the LC molecules 44 which are aligned perpendicular to the substrates 43a and 43b. As this light passes through the LCD panel 42, therefore, the polarization state changes. If the optical compensation plate 45 is not used at this time, light leaks at the time of displaying black, thus reducing the contrast. If the optical compensation plate 45 is located on the light outgoing side, a change in polarization state which is caused by the passing of light in the LCD panel 42 is set back as the light passes the optical compensation plate 45 which has an optically negative polarity. This can improve the visual sense dependency.

In the conventional LCD apparatus as apparent from the above, the TN mode LC alignment structure with a voltage applied is approximately a uniaxial type where the LC molecules aligned perpendicular to the substrates, and the direction of the optic axis of the optical compensation plate is determined based on the property.

As shown in FIG. 1A, however, the LC molecules 44a are aligned upright perpendicular to the substrates 43a and 43b at the center portion in the thickness direction of the actual LCD panel 42, and the LC molecules 44b which are in contact with the substrates 43a and 43b are aligned parallel to the substrates 43a and 43b due to the influence of the aligning films (e.g., polyimide films) formed on the substrates 43a and 43b, so that the LC molecules are not aligned in accordance with the applied electric field. Therefore, the actual alignment states of the LC molecules 44a and 44b differ from the direction of the optic axis 46 of the optical compensation plate 45. As the viewing angle is changed, therefore, the birefringence factor $\Delta$n of the TN liquid crystal and the birefringence factor $\Delta$n of the optical compensation plate 45, when a voltage is applied to the apparatus, vary differently. Even the use of the optical compensation plate 45 cannot provide a sufficient viewing angle compensation effect.

Further, because there is a difference between those birefringence factors $\Delta$n, the transmittance varies in accordance with the viewing angle and the wavelength dependency occurs likewise. Even when white with an intermediate gradation is displayed in the straight view direction, therefore, the display section of the LCD apparatus may be colored as one obliquely observes this display section.

SUMMARY OF THE INVENTION

Accordingly, it is an object of the present invention to provide an LCD apparatus with optical compensation plates, which can compensate the polarization state in an LCD panel over a wide viewing angle range at the time of displaying black, thus sufficiently improving the visual sense dependency and wavelength dependency.

An LCD apparatus comprises a first optical compensation plate consisting of M (M being an integer equal to or greater than 2) optical compensation layers; a second optical compensation plate consisting of N (N being an integer equal to or greater than 2) optical compensation layers; and an LCD panel having (M+N) LC layers. The first optical compensation plate has first and second surfaces, and light is incident from a side of the first surface. The second optical compensation plate has third and fourth surfaces, and light goes out from the fourth surface. The LCD panel is provided between and in contact with the second surface of the first optical compensation plate and the third surface of the second optical compensation plate. The LC layers are made of materials having optically different polarities from those of the first and second optical compensation plates. Further, the direction of the optic axis of an j-th (j =1, 2, . . ., M) optical compensation layer from the first surface of the first optical compensation plate is substantially parallel to the direction of the optic axis of an (M-j+l)-th LC layer from the first optical compensation plate of the LCD panel at the time of voltage application, and the direction of the optic axis of an i-th (i =1, 2, . . ., N) optical compensation layer from the third surface of the second optical compensation plate is substantially parallel to the direction of the optic axis of an (M+N-i+1)-th LC layer from the first optical compensation plate of the LCD panel at the time of voltage application.

It is preferable that the directions of optic axes in the LCD panel at the time of voltage application are substantially constant in the individual LC layers.

It is preferable that the absolute value of the product of the birefringence factor and the layer thickness of the j-th optical compensation layer of the first optical compensation plate is substantially equal to the absolute value of the product of the birefringence factor and the layer thickness of the (M-j+1)-th LC layer of the LCD panel, and the absolute value of the product of the birefringence factor and the layer thickness of the i-th optical compensation layer of the second optical compensation plate is substantially equal to the absolute value of the product of the birefringence factor and the layer thickness of the (M+N-i+1)-th LC layer of the LCD panel.

The LC layers in the LCD panel are formed one type selected from a group of twisted nematic liquid crystal and super twisted nematic liquid crystal.

According to this invention, the LCD panel comprises four or more LC layers and each optical compensation layer of each of the optical compensation plates located on both sides of the LCD panel has an optic axis whose direction is parallel to that of the associated LC layer and whose birefringence factor has the opposite sign to that of the optic axis of the associated LC layer. Even when the direction of the optic axis changes in the thickness direction in the LCD panel, the polarization state of light can be compensated by the optical compensation plates. It is thus possible to improve the visual sense dependency of the LCD panel, thus ensuring an excellent display state over a wide viewing angle range.

This invention can also improve the wavelength dependency which occurs as the transmittance changes in accordance with the viewing angle. It is therefore possible to prevent the LCD panel from appearing to be colored by a change in the viewing angle.

BRIEF DESCRIPTION OF THE DRAWINGS

FIG. 3A is a plan view illustrating the polarization states in first and second optical compensation plates and an LCD panel of an LCD apparatus according to the first embodiment of this invention, and FIG. 3B is a cross-sectional view showing the polarization states in the optical compensation layers and the LC layers;

FIG. 5A is a plan view illustrating the polarization states in first and second optical compensation plates and an LCD panel of an LCD apparatus according to the third embodiment of this invention, and FIG. 5B is a cross-sectional view showing the polarization states in the optical compensation plates and the LC layer when a voltage is applied to the LCD apparatus;

DETAILED DESCRIPTION OF THE PREFERRED EMBODIMENTS

General embodiments of the present invention which are satisfactory in an arbitrary mode will now be described with reference to the accompanying drawings.

Figure 1A:
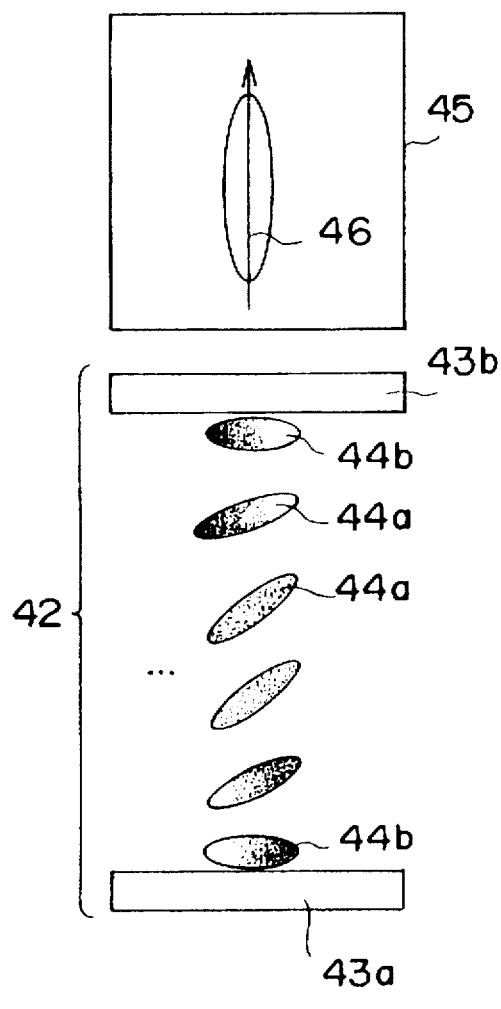
FIGS. 1A and 1B are exemplary diagrams showing the display section of a conventional LCD apparatus using an optical compensation plate.
Figure 1B:
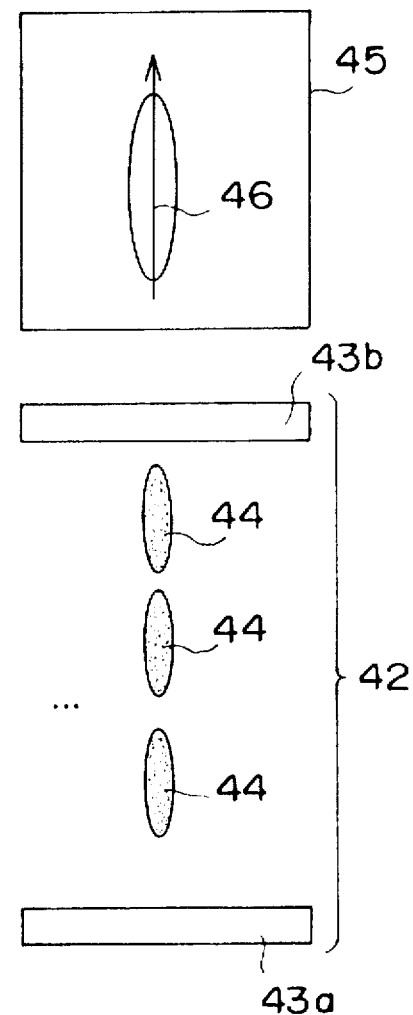
Figure 2:
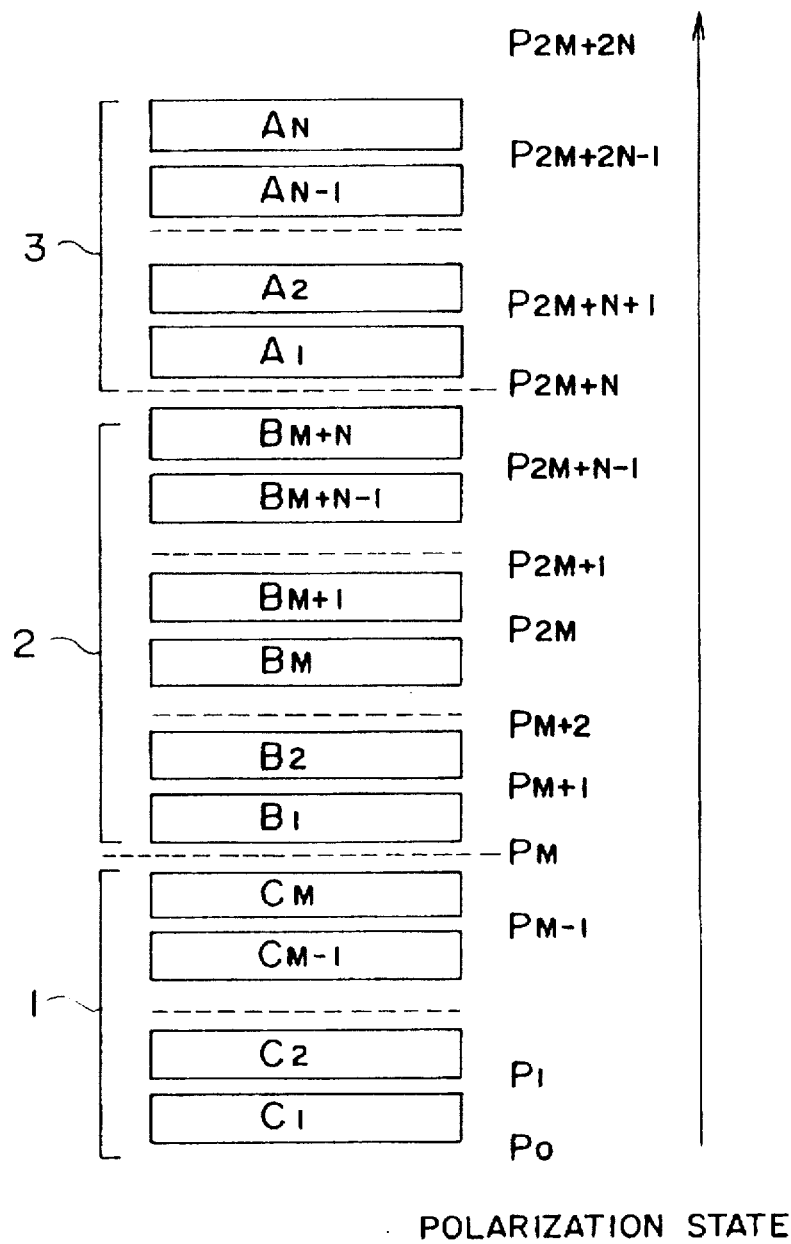
FIG. 2 is an exemplary diagram showing the display section of an LCD apparatus according to this invention.

FIG. 2 presents an exemplary diagram showing the display section of an LCD apparatus according this invention. The display section comprises a first optical compensation plate 1, a second optical compensation plate 3 and an LCD panel 2 sandwiched between those plates 1 and 3. The first and second optical compensation plates 1 and 3 are made of materials which have optically different polarities from those of the LC layers of the LCD panel 2. According to this embodiment, the LC molecules of the LCD panel 2 consist of a composition whose birefringence factor $\Delta n$ is optically positive ($\Delta n > 0$), whereas the optical compensation plates 1 and 3 consist of compositions whose birefringence factors $\Delta n$ are optically negative ($\Delta n < 0$).

According to this invention, the first optical compensation plate 1 is comprised of M optical compensation layers separated in the thickness direction of the plate 1 and the second optical compensation plate 3 is comprised of N optical compensation layers separated in the thickness direction of the plate 3. The individual optical compensation layers in the first optical compensation plate 1 from the light incident side (first surface) of the first optical compensation plate 1 toward the second optical compensation plate 3 are represented by $C_1, C_2, \ldots,$ and $C_M$. Likewise, the individual optical compensation layers in the second optical compensation plate 3 from the first optical compensation plate 1 toward the light outgoing side (fourth surface) of the second optical compensation plate 3 are represented by $A_1, A_2, \ldots,$ and $A_N$. The directions of the optic axes in those optical compensation layers are denoted by $\vec{A}_i$ (i=1, 2, . . . , and N) and $\vec{C}_j$ (j=1, 2, . . . , and M).

The LC alignment structure when a voltage is applied to the LCD panel 2 is divided to (M+N) layers in the thickness direction of the LCD panel 2. The individual optical LC layers in the LCD panel 2 from the first optical compensation plate 1 toward the second optical compensation plate 3 are represented by $B_1, B_2, \ldots,$ and $B_{M+N}$, and the directions of the optic axes in those LC layers are denoted by $\vec{B}_k$ (k=1, 2, . . . , and M +N).

The optical operation of the thus constituted display section of the LCD apparatus will be discussed below. In FIG. 2, it is assumed that light is incident from the side of the first optical compensation plate 1, and the polarization state at the time light is incident is denoted by $P_0$ and the polarization states of the light after passing the individual LC layers and optical compensation layers are denoted by $P_1, P_2, \ldots,$ and $P_{2M+2N}$.

To begin with, a description will be given of the case where light is incident to the display section in the perpendicular direction. The light with the polarization state $P_0$ when hitting the first optical compensation plate 1 generally becomes elliptically polarized light $P_M$ after passing through the first optical compensation plate 1. When the light with the polarization state $P_M$ passes the $B_1$ layer in the LCD panel 2, the polarization state changes to $P_{M+1}$. In general, the alignment structure of the LC molecules vary in the thickness direction in the LCD panel 2, so that the direction of the optic axis also varies in the thickness direction. By setting sufficiently large M and N, therefore, the LC molecules in each LC layer can be treated as a uniaxial optical anisotope.

According to this invention, the direction of the optic axis $\vec{C}_j$ of the optical compensation layers in the first optical compensation plate 1 is defined to be approximately in parallel to the direction of the optic axis $\vec{B}_{M-j+1}$ of the LC layers in the LCD panel 2. That is, the optic axis of the first layer ($B_1$ layer) of the LCD panel 2 is parallel to the optic axis of the last layer ($C_M$ layer) of the first optical compensation plate 1. Because the first optical compensation plate 1 and the liquid crystal of the LCD panel 2 are uniaxial anisotopes which have optically different polarities from each other, the birefringence factor of the $B_1$ layer has the opposite sign to that of the birefringence factor of the $C_M$ layer.

Therefore, the direction in which the polarization state changes to $P_M$ from $P_{M-1}$ becomes opposite to the direction in which the polarization state changes to $P_{M+1}$ from $P_M$. As apparent from the above, when the absolute value of the amount of the birefringence factor ($\Delta n d$) of the first layer ($B_1$ layer) of the LCD panel 2 equals the absolute value of the amount of the birefringence factor ($\Delta n d$) of the last layer ($C_M$ layer) of the first optical compensation plate 1, the polarization states $P_{M-1}$ and $P_{M+1}$ become equal to each other.

Thereafter, light is incident to the second layer ($B_2$ layer) of the LCD panel 2 and the polarization state changes to $P_{M+2}$ But, the birefringence factor of the $B_2$ layer which causes this change in polarization state has the opposite sign to that of the birefringence factor of the (M−1)-th layer ($C_{M+1}$ layer) of the first optical compensation plate 1. The polarization states $P_{M-2}$ and $P_{M+2}$ therefore become equal to each other.

The light further travels inside the LCD panel 2 thereafter, and the same relation is met in each LC layer so that when the light passes the M-th layer in the LCD panel 2, the polarization state becomes $P_{2M}$ which is equal to the polarization state $P_0$. In other words, the incident light with the polarization state $P_0$ is rotated by the first optical compensation plate 1 to be elliptically polarized light which in turn goes out from the first optical compensation plate 1. When this light comes incident to the LCD panel 2, it rotated in the opposite direction, and at the boundary between the $B_M$ layer and $B_{M+1}$ layer in the LCD panel 2, the polarization state returns to $P_0$ which is the polarization state at the time the light has been incident to the first optical compensation plate 1.

When the light further travels toward the second optical compensation plate 3 from the $B_{M+1}$ layer in the LCD panel 2 and leaves the LCD panel 2, the polarization state changes to $P_{2M+N}$. In this invention, the direction of the optic axis $\vec{B}_{M+N-i+1}$ of the LC layers in the LCD panel 2 and the direction of the optic axis $\vec{A}_i$ of the optical compensation layers in the second optical compensation plate 3 are defined to be approximately in parallel to each other. That is, the optic axis of the last layer ($B_{M+N}$ layer) of the LCD panel 2 is parallel to the optic axis of the first layer ($A_1$ layer) of the second optical compensation plate 3. Since the liquid crystal of the LCD panel 2 and the second optical compensation plate 3 are uniaxial anisotopes which have optically different polarities from each other, the birefringence factor of the $B_{M+N}$ layer has the opposite sign to that of the birefringence factor of the $A_1$ layer. Therefore, the polarization states $P_{2M+N-1}$ and $P_{2M+N+1}$ become equal to each other.

Thereafter, the light further travels inside the second optical compensation plate 3 with the same relation met in each optical compensation layer, so that a change in the light while traveling in the second optical compensation plate 3 becomes opposite to a change in the light while traveling to the $B_{M+N}$ layer from the $B_{M+1}$ layer in the LCD panel 2. Accordingly, the polarization state $P_{2M+2N}$ of the outgoing light from the second optical compensation plate 3 becomes equal to the polarization state $P_{2M}$ of the incident light to the $B_{M+1}$ layer in the LCD panel 2 and also to $P_0$.

When the linearly polarized light enters the display section of the LCD apparatus from the first optical compensation plate 1, therefore, it becomes elliptically polarized light by the first optical compensation plate 1 and returns to the original linearly polarized light by the first to M-th layer in the LCD panel 2. This linearly polarized light becomes elliptically polarized light by the (M+1)-th layer to the (M+N)-th layer in the LCD panel 2 and returns to the original linearly polarized light by the second optical compensation plate 3. It is apparent that black can be displayed by arranging the first optical compensation plate 1, the LCD panel 2 and the second optical compensation plate 3 between two polarization plates whose polarization axes are perpendicular to each other according to this invention and applying a voltage to the LCD apparatus.

As apparent from the above, when light hits the display section in the perpendicular direction, the incident light becomes equal to the outgoing light. This phenomenon occurs because uniaxial materials, whose optic axes are parallel to each other and which have optically positive and negative polarities, have birefringence factors $\Delta n$ of the opposite signs. A similar phenomenon would occur in the case when light is obliquely incident to the display section. That is, uniaxial materials, whose optic axes are parallel to each other and which have optically positive and negative polarities, likewise have birefringence factors $\Delta n$ of the opposite signs even when light is obliquely incident to the display section. Therefore, the polarization state of the oblique incident light to the first optical compensation plate 1 is the same as that of the outgoing light from the second optical compensation plate 3.

It is apparent from the above that black can be displayed regardless of the viewing angle, by arranging the first optical compensation plate 1, the LCD panel 2 and the second optical compensation plate 3 between two polarization plates whose polarization axes are perpendicular to each other according to this invention and applying a voltage to the LCD apparatus. As the optical compensation plates 1 and 3 of this invention can compensate for the polarization state of light regardless of the wavelength of the incident light, it is possible to improve the wavelength dependency that occurs as the transmittance varies in accordance with the viewing angle.

In the TN mode liquid crystal with a voltage applied, as described above, the alignment state of the LC molecules in the vicinity of the substrates that constitute the LCD panel 2 differs from the alignment state of the LC molecules at the center portion of the LCD panel 2 in the thickness direction, so that the LCD panel 2 should desirably have an LC section consisting of four or more layers (N+M≧4). The number of the optical compensation layers of the first optical compensation plate 1 need not be the same as the number of the optical compensation layers of the second optical compensation plate 3. The second optical compensation plate 3 may be enhanced by setting M=2×N, for example.

The following will discuss the first embodiment of this invention as adapted to a normally white TN mode liquid crystal as a specific example. FIG. 3A is a plan view illustrating the polarization states in first and second optical compensation plates and an LCD panel of an LCD apparatus according to the first embodiment of this invention, and FIG. 3B is a cross-sectional view showing the polarization states in the optical compensation layers and the LC layers. According to this embodiment, for example, an LCD panel 12 is divided to six sections in the thickness direction and each of first and second optical compensation plates 11 and 13 is divided to three sections. The optic axes in the individual LC layers are set in a specific direction. If those optic axes do not appear to be set in a specific direction, however, the LCD panel may be divided to a greater number of sections to permit the optic axes in the individual LC layers to be set in a specific direction. In the following description, the state of elliptically polarized light at a position q is expressed by P(q).

A description will be given first of the case where light comes incident from the first optical compensation plate 11 in the direction perpendicular thereto, passes the LCD panel 12 and leaves from the second optical compensation plate 13. The polarization state of the light, which has passed the first optical compensation plate 11, at a position A0 is generally an elliptical polarization state P(A0). The polarization state of the light, which has passed the first layer of the LCD panel 12, at a position A1 becomes P(A1). A change in the polarization state of the light that has traveled to the position A1 from the position A0 becomes opposite to a change in the polarization state of the light that has traveled to the position A0 from the position A−1. This is because the optic axis of the section (A−1 to A0) in the optical compensation plate 11 is parallel to the optic axis of the section (A0 to A1) in the LCD panel 12 and their birefringence factors Δn have the opposite signs. Therefore, the polarization state P(A—1) becomes the same as the polarization state P(A1).

Likewise, because the amount of the birefringence (Δnd) of the section (A1–A2) and the amount of the birefringence (Δnd) of the section (A−2 to A−1) have the opposite signs, the polarization state P(A−2) becomes the same as the polarization state P(A2). Through the similar procedures, the polarization state P(A−3) of the light when having being incident to the first optical compensation plate 11 becomes the same as the polarization state P(A3) of the light at a position A3.

Such a relationship is satisfied even when light moves to a position B3 in the second optical compensation plate 13 from a position B−3 in the LCD panel 12. That is, the polarization state P(B−3) and the polarization state P(B3) become the same. Therefore, the incident linearly polarized light becomes elliptically polarized light by the first optical compensation plate 11 but returns to the original linearly polarized light at the center portion (position A3) of the LCD panel 12. When the light travels to the position B0 from the position A3(B−3) of the LCD panel 12, the light becomes elliptically polarized light again after which the light returns to the original linearly polarized light as it passes the second optical compensation plate 13.

A description will now be given of the case where light is obliquely incident from the first optical compensation plate 11. Even in such a case, as in the case where light is perpendicularly incident, the uniaxial materials, whose optic axes are parallel to each other and which have birefringence factors (Δn) with the optically opposite signs, cause changes in birefringence (Δnd) of the same amount but with different signs. That is, a uniaxial material having an optically positive polarity causes a change in the amount of birefringence expressed by Δnd with respect to light perpendicularly incident to the optical compensation plate 11. This uniaxial material causes a change in the amount of birefringence smaller than Δnd and with respect to obliquely incident light.

A uniaxial material having an optically negative polarity causes a change in the amount of birefringence expressed by −Δnd with respect to light perpendicularly incident to the optical compensation plate 11, and causes a change in the amount of birefringence greater (smaller in the absolute value) than −Δnd with respect to obliquely incident light. In this manner, the amounts of birefringence of the uniaxial materials having optically positive and negative polarities are canceled out with each other.

Even if the incident light to the first optical compensation plate 11 becomes elliptically polarized light by this first optical compensation plate 11, the light returns to the original linearly polarized light at the center portion of the LCD panel. Even if the light becomes elliptically polarized light again after the center portion of the LCD panel, the light returns to the original linearly polarized light by the second optical compensation plate 13. According to this embodiment, therefore, black can be displayed over a wide viewing angle range by arranging the first optical compensation plate 11, the LCD panel 12 and the second optical compensation plate 13 between two polarization plates whose polarization axes are perpendicular to each other and applying a voltage to the LCD apparatus. This proves that the view angle dependency has been improved.

In the normally white TN mode, when black is displayed, the liquid crystal at the cross-sectional center portion of the LCD panel 12 in the thickness direction is set upright, while the optic axes of the liquid crystal in the vicinity of the substrates 14a and 14b which constitute the LCD panel 12 are parallel to the substrates 14a and 14b. In other words, a change in the optic axis of the liquid crystal is set upright from the state parallel to the substrate 14a in the thickness direction of the LCD panel 12 while being rotated within the plane, and returns to the parallel state to the substrate 14b as it approaches the substrate 14b. It is therefore necessary to also rotate the optic axes of the individual optical compensation layers in the first and second optical compensation plates 11 and 13 in their planes.

Although the foregoing description has been given of the case with the normally white TN liquid crystal, more generally speaking, the same explanation is applied to the combination of any liquid crystal mode and the associated upper and lower optical compensation plates. For example, the LCD apparatus of this invention can be adapted to a super twisted nematic (STN) liquid crystal too.

Figure 4:
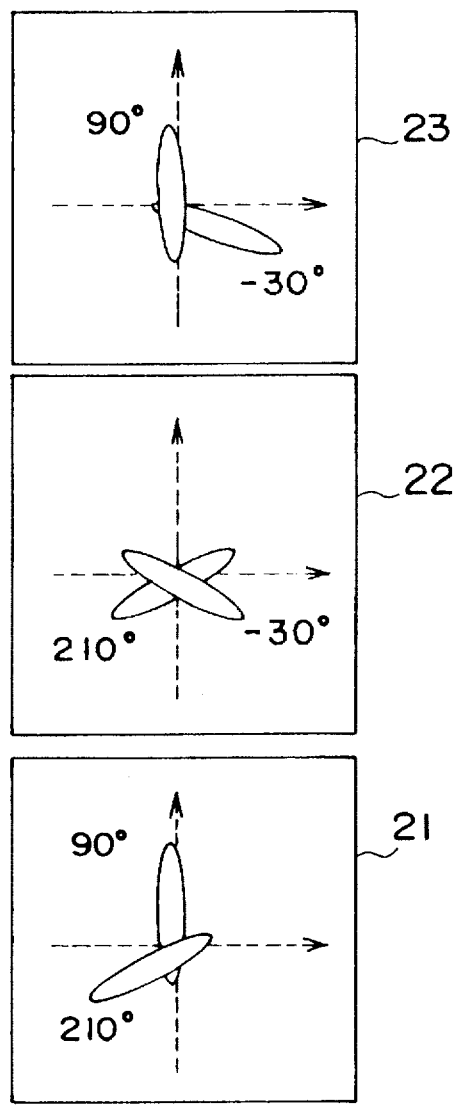
FIG. 4 is a plan view illustrating the polarization states in first and second optical compensation plates and an LCD panel of an LCD apparatus according to the second embodiment of this invention.

The following will discuss the second embodiment of this invention as adapted to an STN liquid crystal. FIG. 4 presents a plan view illustrating the polarization states in first and second optical compensation plates and an LCD panel of an LCD apparatus according to the second embodiment of this invention when a voltage is applied to the LCD apparatus. Referring to FIG. 4, a LCD panel 22 uses an STN mode liquid crystal having a twist angle of 240 degrees (twisted clockwise to −30 degrees from 210 degrees). This liquid crystal has an optically positive polarity. According to this embodiment, therefore, a first optical compensation plate 21 has a composition having an optically negative polarity and has its optic axis twistable counterclockwise to 210 degrees from 90 degrees. A second optical compensation plate 23 has a composition having an optically negative polarity and has its optic axis twistable counterclockwise to 90 degrees from −30 degrees.

When a voltage is applied to the LCD panel 22 having the thus obtained STN liquid crystal , it is possible to keep displaying black over a wide viewing angle range and prevent the STN liquid crystal from being colored, thus ensuring the black and white display.

Figure 6:
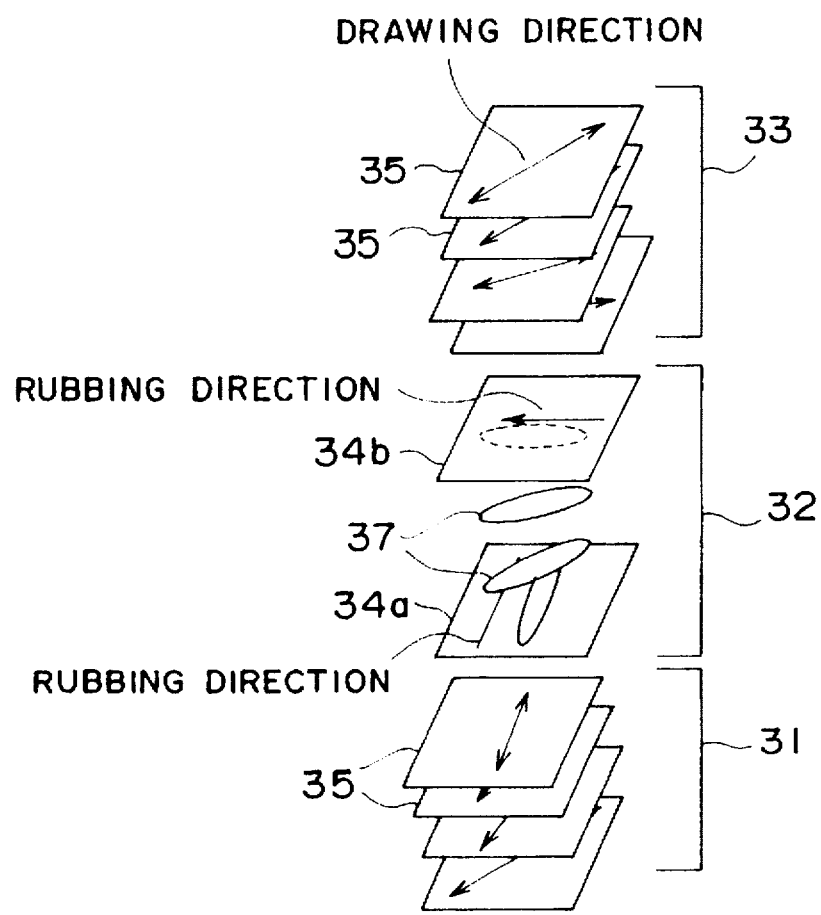
FIG. 6 is an exemplary diagram showing the method of manufacturing the display section of the LCD apparatus according to the third embodiment of this invention.

A description will now be given of the third embodiment of this invention as adapted to a normally black TN mode liquid crystal. FIG. 5A is a plan view illustrating the polarization states in first and second optical compensation plates and an LCD panel of an LCD apparatus according to the third embodiment of this invention when a voltage is applied to the LCD apparatus, and FIG. 5B is a cross-sectional view showing the polarization states in the optical compensation plates and the LC layer when a voltage is applied to the LCD apparatus. FIG. 6 presents an exemplary diagram showing the method of manufacturing the display section of the LCD apparatus according to the third embodiment of this invention.

First, polyimide thin films (AL1051 produced by Japan Synthetic Rubber Co., Ltd.; not shown) are formed on two glass substrates 34a and 34b on which transparent conductive thin films (ITO) are formed. The surfaces of the polyimide thin films are rubbed to control the alignment state of the liquid crystal contacting those surfaces to the desired state. Then, those two glass substrates are arranged with the polyimide thin films formed sides facing inward, and are adhered via a spacer (micro pearl produced by Sekisui Chemical Co., Ltd.; not shown) by an ultraviolet-ray hardening adhesive. At this time, the diameter of the spacer is so adjusted that the cell thickness becomes 6 μm, for example.

Next, for example, a nematic liquid crystal 37 is injected between the two glass substrates in a vacuum tank. In this embodiment, a liquid crystal obtained by adding 0.5% by weight of cholestric liquid crystal with a left-handed helical structure to ZII-4792 (Merck & Co., Inc.; Δn =0.0969) was used. Then, the space between the two glass substrates 34a and 34b is sealed by using an ultraviolet-ray hardening adhesive, thus yielding a LCD panel 32.

The optic axes of first and second optical compensation plates 31 and 33 are twisted in the opposite direction to the optic axis of the liquid crystal used in the LCD panel 32, and those optical compensation plates 31 and 33 are manufactured so as to have an optical structure with a twist angle of 45 degrees and a negative birefringence factor Δn. Because the amount of birefringence, Δnd, of the TN mode liquid crystal used in this embodiment is about 0.58, the amounts of birefringence Δnd of the first optical compensation plate 31 and the second optical compensation plate 33 may be adjusted to be approximately –0.29.

The first and second optical compensation plates 31 and 33 were manufactured by laminating ten polystyrene films 35 each having the amount of birefringence Δnd of –0.029 and stretched in the uniaxial direction. As shown in FIG. 6, each of the first and second optical compensation plates 31 and 33 was formed by shifting the drawing directions of the ten polystyrene films 35 in such a manner that the drawing directions of the first polystyrene film 35 and the drawing directions of the tenth polystyrene film 35 form an angle of 45 degrees and that the ten polystyrene films 35 form a right-handed helical structure.

To prove the advantages of this invention, the view angle dependency of the transmittance was evaluated in the case where the display section of the LCD apparatus according to the third embodiment was arranged between two polarization plates (not shown) having polarization axes perpendicular to each other. Also evaluated was the view angle dependency of the transmittance in the case where, as a comparative example, a single TN mode LC panel was arranged between two polarization plates having polarization axes perpendicular to each other.

Figure 7:
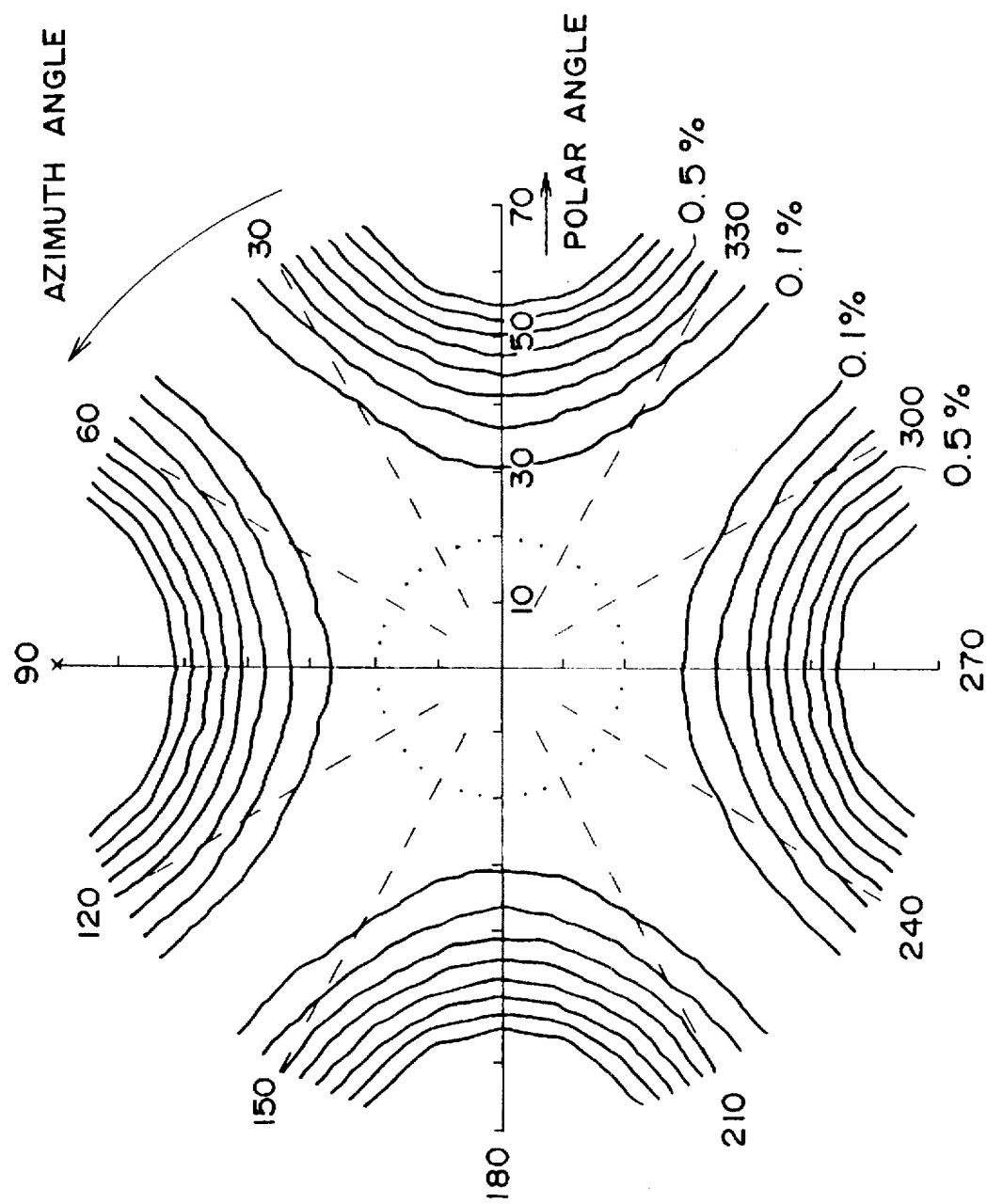
FIG. 7 is an exemplary diagram showing the visual sense dependency of the LCD apparatus according to the third embodiment.
Figure 8:
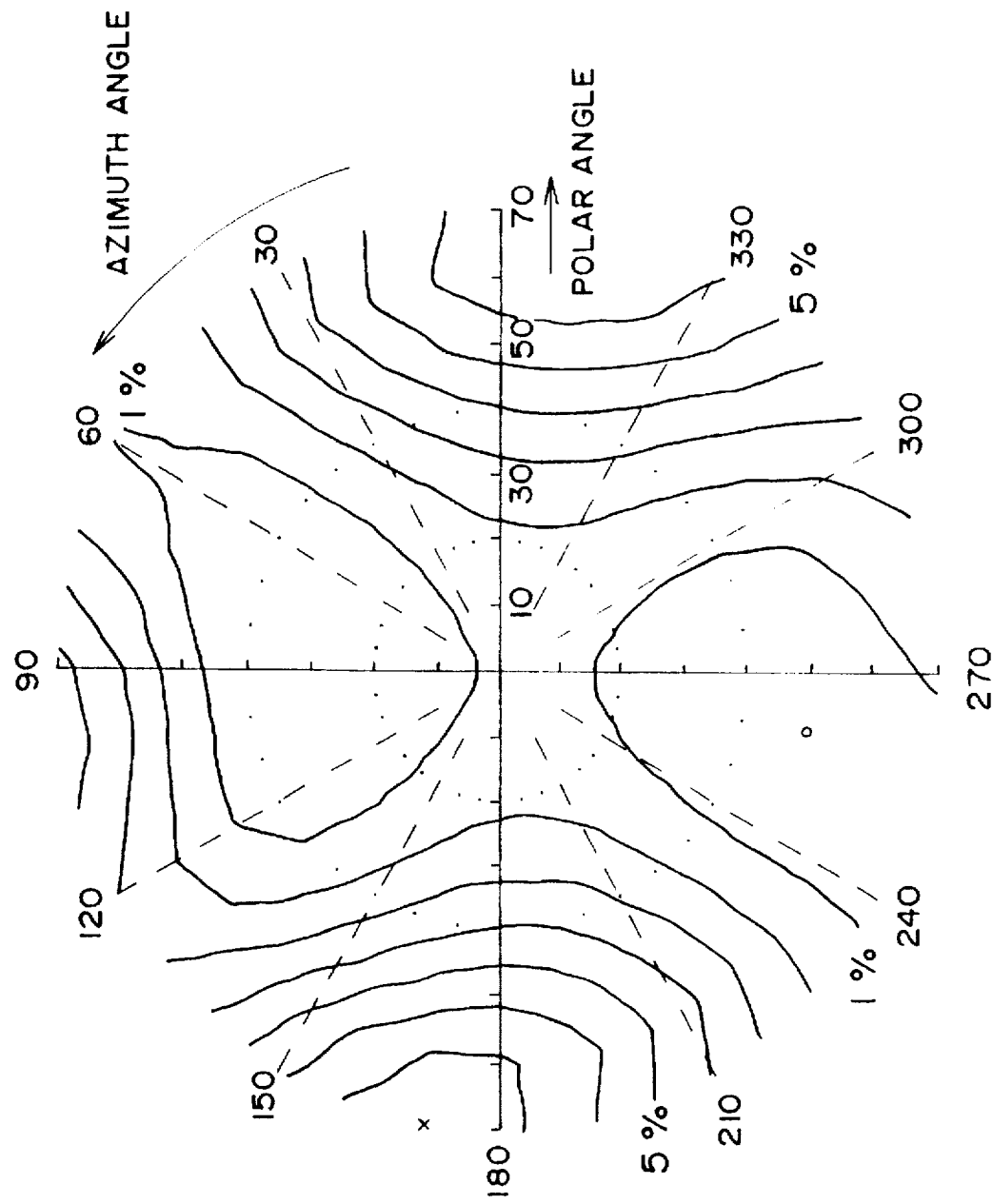
FIG. 8 is an exemplary diagram showing the visual sense dependency of an LCD apparatus according to a comparative example.

FIG. 7 is an exemplary diagram showing the visual sense dependency of the LCD apparatus according to the third embodiment, and FIG. 8 is an exemplary diagram showing the visual sense dependency of an LCD apparatus according to the comparative example. As shown in FIGS. 7 and 8, the transmittance of the LCD apparatus according to the comparative example is 5.5% whereas the transmittance of the LCD apparatus according to this embodiment is 0.6% in the case with the azimuth angle of 0 degree and the polar angle of 50 degrees. The LCD apparatus according to this embodiment could have an excellent visual sense dependency.

What is claimed is:

1. A liquid crystal display apparatus comprising:

a first optical compensation plate consisting of M (M being an integer equal to or greater than 2) optical compensation layers and having first and second surfaces, light being incident from a side of said first surface;

a second optical compensation plate consisting of N (N being an integer equal to or greater than 2) optical compensation layers and having third and fourth surfaces, light going out from said fourth surface;

a liquid crystal display panel provided between and in contact with said second surface of said first optical compensation plate and said third surface of said second optical compensation plate, said liquid crystal display panel having (M+N) liquid crystal layers, said liquid crystal layers being made of materials having optically different polarities from those of said first and second optical compensation plates, a direction of an optic axis of a j-th (j=1, 2, ... , M) optical compensation layer from said first surface of said first optical compensation plate being substantially parallel to a direction of an optic axis of an (M–j+1)-th liquid crystal layer from said first optical compensation plate of said liquid crystal display panel at a time of voltage application, a direction of an optic axis of an i-th (i=1, 2, ... , N) optical compensation layer from said third surface of said second optical compensation plate being substantially parallel to a direction of an optic axis of an (M+N–i+1)-th liquid crystal layer from said first optical compensation plate of said liquid crystal display panel at a time of voltage application.

2. The liquid crystal display apparatus according to claim 1, wherein directions of optic axes at a time of voltage application are substantially constant in individual liquid crystal layers.

3. The liquid crystal display apparatus according to claim 1, wherein an absolute value of a product of a birefringence factor and a layer thickness of said j-th optical compensation layer of said first optical compensation plate is substantially equal to an absolute value of a product of a birefringence factor and a layer thickness of said (M–j+1)-th liquid crystal layer of said liquid crystal display panel, and an absolute value of a product of a birefringence factor and a layer thickness of said i-th optical compensation layer of said second optical compensation plate is substantially equal to an absolute value of a product of a birefringence factor and a layer thickness of said (M+N–i+1)-th liquid crystal layer of said liquid crystal display panel.

4. The liquid crystal display apparatus according to claim 1, wherein said liquid crystal layers are formed one type selected from a group of twisted nematic liquid crystal and super twisted nematic liquid crystal.

* * * * *